United States Patent

[11] 3,575,190

| [72] | Inventors | Louis M. Puster;<br>Edward N. Caldwell, Knoxville, Tenn. |
|------|-----------|------|
| [21] | Appl. No. | 805,531 |
| [22] | Filed | Mar. 10, 1969 |
| [45] | Patented | Apr. 20, 1971 |
| [73] | Assignee | Robertshaw Controls Company<br>Richmond, Va. |

[54] PNEUMATIC CONTROL SYSTEM AND PNEUMATIC RELAY FOR THE SAME OR THE LIKE
20 Claims, 5 Drawing Figs.

[52] U.S. Cl............................................... 137/85,
137/627.5, 137/596.18
[51] Int. Cl.............................................. F15b 5/00,
G05d 16/00
[50] Field of Search........................................... 137/82, 84,
85, 627.5, 596.18

[56] References Cited
UNITED STATES PATENTS

| 2,334,834 | 11/1943 | Newell | 137/85X |
| 2,516,333 | 7/1950 | Moore | 137/84 |
| 2,964,924 | 12/1960 | Dodge | 137/85X |
| 3,166,085 | 1/1965 | Holloway | 137/82 |

*Primary Examiner*—Alan Cohan
*Attorney*—Candor, Candor, & Tassone

ABSTRACT: This disclosure relates to a pneumatic relay comprising a housing carrying three diaphragms in stacked relation that cooperate therewith and define a main pressure chamber, a branch pressure chamber, an exhaust chamber and a pilot pressure chamber in stacked relation with the housing having a stationary valve seat for interconnecting the main chamber and the branch chamber together. One of the outboard diaphragms opens and closes the valve seat and the intermediate diaphragm has an opening therethrough for interconnecting the branch chamber and the exhaust chamber together. A movable valve member is disposed in the branch chamber and projects into the valve seat for controlling the opening in the intermediate diaphragm by preventing fluid communication between the branch chamber and the exhaust chamber when the valve member is engaged by both the intermediate diaphragm and the one outboard diaphragm and by permitting fluid communication between the branch chamber and the exhaust chamber when the valve member is not engaged by one of the one outboard diaphragm and the intermediate diaphragm.

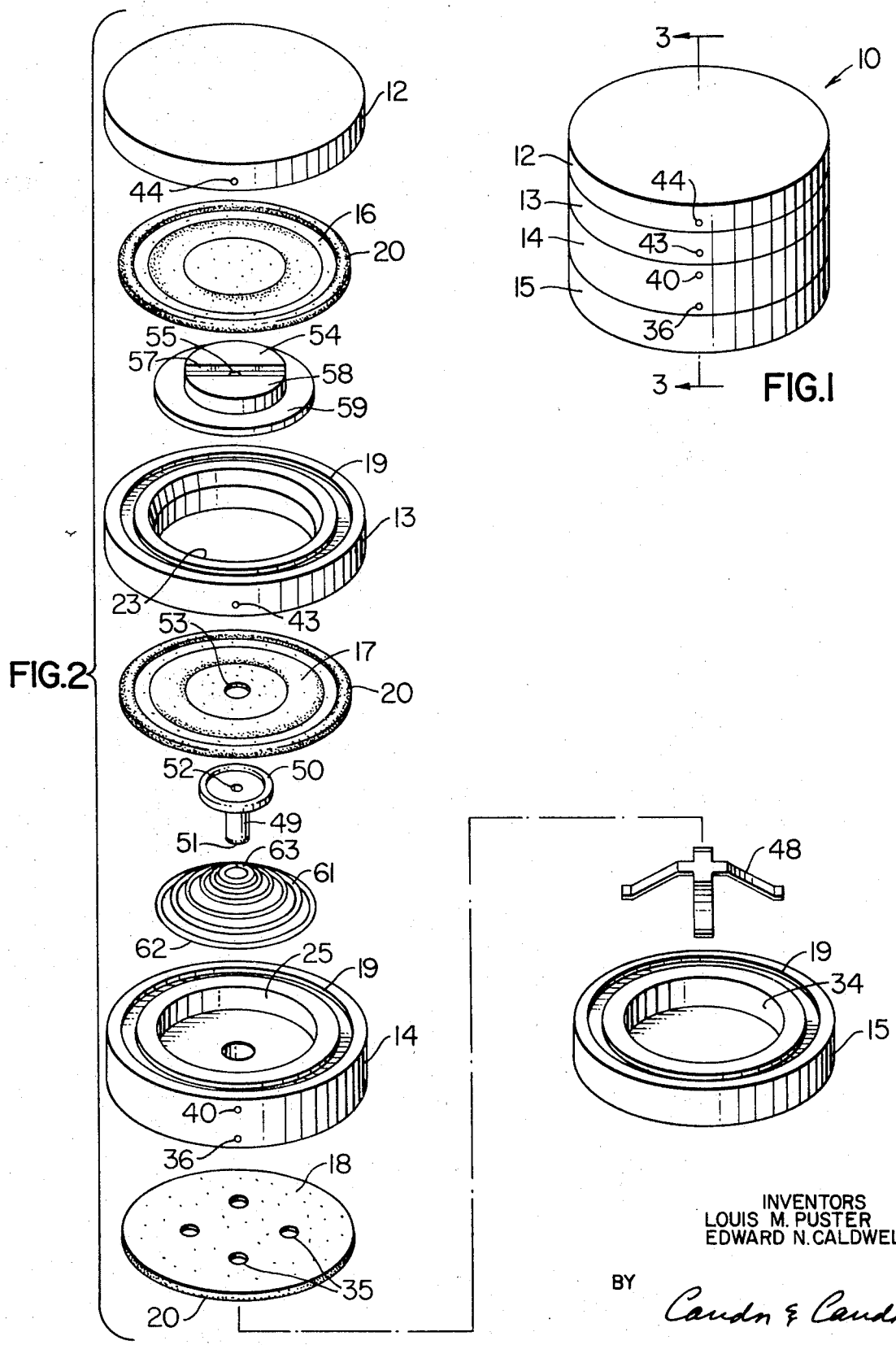

INVENTORS
LOUIS M. PUSTER
EDWARD N. CALDWELL

BY

*Cauden & Cauden*

THEIR ATTORNEYS

PNEUMATIC CONTROL SYSTEM AND PNEUMATIC RELAY FOR THE SAME OR THE LIKE

This invention relates to an improved pneumatic control system as well as to an improved pneumatic relay for such a control system or the like.

It is well known that pneumatic relays of the volume boosting or multiplying type have been provided wherein a pressure source is adapted to be interconnected to a branch line leading to a control device proportionally to a pneumatic control signal or pilot signal being directed to the pilot chamber of the relay that controls the degree of opening between the main pressure chamber thereof and the branch chamber thereof.

It is a feature of this invention to provide such a pneumatic relay which is less expensive to manufacture, easier to assemble and whose performance is equal to or superior to conventional pneumatic relays.

In particular, one embodiment of this invention provides a pneumatic relay wherein no staking, riveting or other subassembly operations are required as in conventional relay constructions, all of the parts of this invention being adapted to be dropped into place and self-aligning so that alignment problems are greatly reduced as well as the manufacturing costs thereof.

For example, the pneumatic relay of this invention causes a housing carrying three diaphragms in stacked relation to cooperate with the housing to define a main pressure chamber, a branch pressure chamber, an exhaust chamber and a pilot pressure chamber in stacked relation with the housing means having a stationary valve seat for interconnecting the main chamber and the branch chamber together and being disposed between the intermediate diaphragm and one of the outboard diaphragms. That one outboard diaphragm is adapted to open and close the valve seat and the intermediate diaphragm has an opening therethrough for interconnecting the branch chamber and the exhaust chamber together. A movable valve member is disposed in the branch chamber and projects into the valve seat for controlling the opening in the intermediate diaphragm by preventing fluid communication between the branch chamber and the exhaust chamber when the valve member is engaged by both the intermediate diaphragm and the one outboard diaphragm and by permitting fluid communication between the branch chamber and the exhaust chamber when the valve member is not engaged by one of the one outboard diaphragm and the intermediate diaphragm. A motion transmitting member is disposed in the exhaust chamber to translate motion between the other outboard diaphragm and the intermediate diaphragm, the motion transmitting member having passage means for always fluidly interconnecting the opening of the intermediate diaphragm to the exhaust chamber.

Accordingly, it is an object of this invention to provide an improved pneumatic control system having one or more of the novel features set forth above or hereinafter shown or described.

Another object of this invention is to provide improved pneumatic relay construction having one or more of the novel features set forth above or hereinafter shown or described.

Other objects, uses and advantages of this invention are apparent from a reading of this description which proceeds with reference to the accompanying drawings forming a part thereof and wherein:

FIG. 1 is a perspective view of the improved pneumatic relay construction of this invention.

FIG. 2 is an exploded perspective view of the various parts of the pneumatic relay of this invention.

Figure 3:
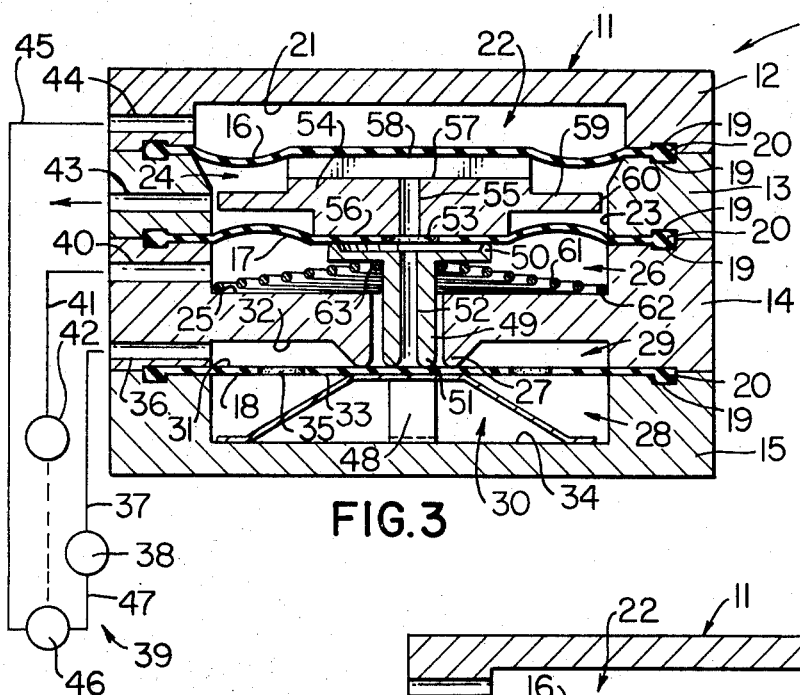
FIG. 3 is an enlarged cross-sectional view taken on line 3–3 of FIG. 1 and illustrates the pneumatic relay of this invention utilized in the pneumatic control system of this invention.

While the various features of this invention are hereinafter described and illustrated as being particularly adapted to provide a pneumatic relay construction for controlling a pneumatically operated heat-exchanging device, it is to be understood that the various features of this invention can be utilized singly or in any combination thereof to provide control means for other devices as desired.

Therefore, this invention is not to be limited to only the embodiment illustrated in the drawings, because the drawings are merely utilized to illustrate one of the wide variety of uses of this invention.

Referring now to FIGS. 1, 2 and 3, the improved relay of this invention is generally indicated by the reference numeral 10 and comprises a housing means 11 formed from a plurality of housing members 12, 13, 14, and 15 formed of any suitable material, such as plastic or the like, and defining any desired external configuration, such as the cylindrical configuration illustrated in the drawings, when the housing members 12—15 are disposed in their stacked and assembled relation as illustrated in FIG. 3.

The housing members 12—15 of the relay construction 10 are stacked together with three separate flexible diaphragm means 16, 17 and 18 held therebetween in stacked aligned relation, the housing members 12—15 having cooperating annular grooves 19 in their facing surfaces to receive outer peripheral bead means 20 of the diaphragms 16—18 therebetween to not only seal the diaphragms 16—18 thereto but also to hold the outer peripheries 19 of the diaphragms 16—18 in place. The upper diaphragm 16 cooperates with a recess 21 in the housing member 12 to define a pilot pressure chamber 22. The upper diaphragm 16 and lower diaphragm 17 cooperate with an opening 23 passing through the housing member 13 to define an exhaust chamber 24. The intermediate diaphragm 17 cooperates with a recess 25 in the housing member 14 to define a branch pressure chamber 26, the recess 25 in the housing member 14 defining a stationary valve seat 27 disposed between the intermediate diaphragm 17 and the outboard diaphragm 18 that is adapted to fluidly interconnect a main pressure chamber 28 of the housing means 11 to the branch chamber 26 when the valve seat 27 is open.

The outboard diaphragm 18 divides the main pressure chamber 28 into two sections 29 and 30, the section 29 being defined between the upper side 31 of the diaphragm 18 and a recess 32 in the housing member 14 while the section 30 of the chamber 28 is defined between the lower side 33 of the diaphragm 18 and a recess 34 in the housing member 15. The diaphragm 18 has a plurality of apertures 35 passing therethrough to always fluidly interconnect the sections 29 and 30 of the main pressure chamber 28 together regardless of the operating position of the outboard diaphragm 18 as will be apparent hereinafter.

The housing member 14 has a passage means 36 radially passing therethrough to fluidly interconnect the main pressure chamber 28 to a conduit means 37, FIG. 3, that leads from a main pressure source 38 of the improved pneumatic control system of this invention generally indicated by the reference numeral 39 in FIG. 3. The housing member 14 has another passage means 40 radially disposed therein to fluidly interconnect the branch pressure chamber 26 to a conduit means 41 that leads to a pneumatically operated device 42 that is to be controlled by the system 39.

By way of example only, the pneumatically operated device 42 can comprise a pneumatically operated heat exchanger means that increases its temperature output effect upon an increase of pneumatic pressure being directed thereto by the conduit 41 and decreasing its temperature output effect upon a decrease of pressure being directed thereto by the conduit 41 in a manner well known in the art.

The housing member 13 has a passage means 43 formed radially therein to fluidly interconnect the atmosphere to the exhaust chamber 24. The housing member 12 has a passage means 44 formed radially therein to fluidly interconnect the pilot pressure chamber 22 to a conduit means 45 that leads from a condition responsive means 46 that receives pressure from the pneumatic source 38 through a conduit 47 and interconnects that main pressure to the conduit 45 proportionately to deviations in the output temperature effect of the pneumatically operated heat exchanger 42 as sensed by the device 46 in relation to a selected temperature effect setting of the condition responsive device 46 in a manner well known in the art.

With the outboard diaphragm 18 of the pneumatic relay 10 being seated against the valve seat 27 to prevent fluid communication between the main pressure chamber 28 and the branch pressure chamber 26, it can be seen that the pneumatic pressure in the chamber 28 acts against the lower side 33 of the diaphragm 18 as well as against the upper side 31 thereof. However, the effective surface area of the lower side 33 is greater than the effective surface area of the upper side 31 of the diaphragm 18 so that the main pressure in the chamber 28 tends to maintain the diaphragm 18 in its closed position against the valve seat 27. However, if desired, spring means can be utilized to also tend to maintain the diaphragm 18 in its closed position against the valve seat 27. For example, in the embodiment of the invention illustrated in the drawings, a spider type of leaf spring 48 is disposed in the section 30 of the chamber 28 to always tend to maintain the diaphragm 18 in its closed position against the valve seat 27.

A valve member 49 is disposed in the branch pressure chamber 26 and projects into the valve seat 27 as illustrated, the valve member 49 being movable relative to the housing means 11 and having a large valve seat 50 on the upper end thereof adapted to be opened and closed by the intermediate diaphragm 17 and a smaller valve seat 51 on the lower end thereof that projects through the valve seat 27 so as to be opened and closed by the outboard diaphragm 18.

The valve seat means 50 and 51 of the valve member 49 are fluidly interconnected together by a passage means 52 passing centrally through the valve member 49. The upper valve seat 50 of the valve member 49 is so constructed and arranged that when the same is seated against the intermediate diaphragm 17, the valve seat 50 fluidly interconnects an opening 53 passing through the intermediate diaphragm 17 to the passage means 52 thereof the valve seat 50 seats concentrically about the opening 53 passing centrally through the intermediate diaphragm 17. The opening 53 in the intermediate diaphragm 17 is adapted to fluidly interconnect the branch pressure chamber 26 to the exhaust chamber 24 in a manner hereinafter described.

A motion transmitting member 54 is disposed in the exhaust chamber 24 to translate motion between the outboard diaphragm 16 and the intermediate diaphragm 17 in a manner hereinafter described, the motion transmitting member 54 having a passage 55 formed therein that interrupts the lower surface 56 thereof and interconnects with a transverse slot or groove 57 formed diametrically across the the upper surface 58 thereof. The passage 55 in the motion transmitting member 54 is aligned with the opening means 53 in the intermediate diaphragm 17 so that the opening 53 is always fluidly interconnected by the passage means 55 and slot or groove 57 of the motion transmitting member 54 to the exhaust chamber 24 even though the upper outboard diaphragm 16 is engaging against the upper surface 58 thereof and the intermediate diaphragm 17 is engaging against the lower surface 56 thereof.

In order to insure alignment of the passage means 55 of the motion transmitting member 54 with the opening 53 in the intermediate diaphragm 17, the motion transmitting member 54 has an intermediate outwardly directed annular flange 59 that has its outer peripheral edge 60 disposed closely adjacent the internal peripheral surface 23 of the housing member 13 so as to guide the movement of the motion transmitting member 54 relative to the housing means 11 during movement of the diaphragm means 16—18 as will be apparent hereinafter.

If desired, a compression spring 51 can be disposed in the branch pressure chamber 26 so as to have one end 62 thereof bearing against the housing member 14 and the other end 63 thereof bearing against the valve member 49 to tend to maintain the valve seat 50 of the valve member 49 in seating engagement against the diaphragm 17 whereby the valve member 49 will follow the movement of the intermediate diaphragm 17 as will be apparent hereinafter.

From the above description of the various parts of the pneumatic relay 10 of this invention, it can readily be seen from FIG. 2 that all of the parts thereof can be dropped into place and are self-centering upon the assembly thereof to form the relay construction 10 as illustrated in FIG. 3 without the requirement of stacking, riveting or other subassembly operations to produce the pneumatic relay 10 of this invention, the stacked housing members 12—15 being readily secured together in assembled relation in any suitable manner, such as by ultrasonically welding or adhesively bonding the engaging surfaces thereof together in their assembled relation or by bolting the same together in their aligned stacked relation.

The operation of the pneumatic relay 10 of this invention when utilized in the pneumatic control system 39 of this invention will now be described.

Referring now to FIG. 3, it is assumed that the condition responsive means 46 has been set at a selected temperature output effect that the pneumatically operated heat exchanger means 42 is to produce, such as 75° F. and, it is further assumed that the output temperature effect of the pneumatically operated device 42 is at the selected temperature output effect whereby the pneumatic relay 10 is disposed in the position illustrated in FIG. 3 because the pneumatic pressure having been fed from the branch pressure chamber 26 through the conduit 41 to the heat exchanger device 42 has set the device 42 to produce the selected temperature output effect whereby the pneumatic signal being directed by the condition responsive means 46 through the conduit 45 to the pilot pressure chamber 22 is equal to the pressure in branch pressure chamber 26 so that the pressure differential across the outboard diaphragm 18 in combination with the force of the spring 48 maintains the diaphragm 18 against the valve seat 27 to prevent fluid communication between the main pressure chamber 28 and the branch pressure chamber 26. In addition, the pressure in the pilot pressure chamber 22 acting to move the diaphragm 16 downwardly is opposed by the pressure in the branch pressure chamber 26 in such a manner that the motion transmitting member 54 holds the intermediate diaphragm 17 against the valve seat 50 of the valve member 49 and holds the valve seat means 51 of the valve member 49 in its closed position against the lower outboard diaphragm 18 so that the branch pressure chamber 26 is prevented from being in fluid communication with the exhaust chamber 24 through the opening means 53 of the intermediate diaphragm 17.

Figure 4:
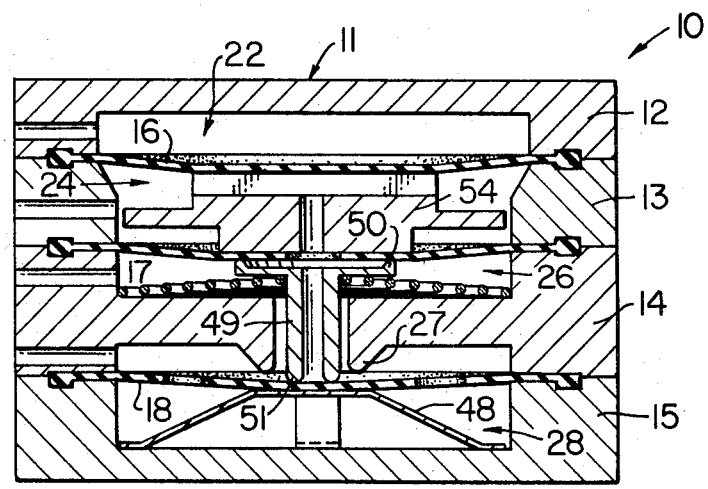
FIG. 4 is a view similar to FIG. 3 and illustrates the pneumatic relay in another operating position thereof.

However, should the output temperature effect of the pneumatically operated heat exchanger means 42 fall below the selected output temperature effect setting of the condition responsive means 46 a sufficient amount, the condition responsive means 46 increases the pressure of the pneumatic signal being directed thereby through the conduit 45 to the pilot chamber 22 of the relay 10 so that the pressure in the pilot chamber 22 now overcomes the pressure in the branch pressure chamber 26 and moves the diaphragm stack 16, 54, 17, 49, and 18 downwardly in the manner illustrated in FIG. 4 to open the valve seat 27 in opposition to the force of the spring 48 as illustrated in FIG. 4.

Since the downwardly moving diaphragm stack as illustrated in FIG. 4 maintains the valve seat means 50 and 51 of the valve member 49 respectively in seating engagement with the diaphragm means 17 and 18, the valve member 49 still prevents fluid communication between the branch pressure chamber 26 and the exhaust chamber 24. However, the opening of the valve seat 27 permits the relay 10 to interconnect the main pressure chamber 28 to the branch pressure chamber 26 and, thereby, increase the branch pressure now being directed by the conduit 41 to the pneumatically operated heat exchanger device 42 to increase the output temperature effect thereof substantially proportional to the increase in the pneumatic pressure signal being directed to the pilot pressure chamber 22 by the condition responsive means 46. When the condition responsive means 46 senses that the increased temperature output of the heat exchanger device 42 has now again reached the preselected temperature output effect setting of the condition responsive means 46, the pneumatic signal being directed by the device 46 to the chamber 22 decreases to permit the diaphragm stack 16, 54, 17, 49, and 18 to return to the position illustrated in FIG. 3 whereby the system 39 will remain in the condition illustrated in FIG. 3 until there is another deviation in the temperature output effect of the heat exchanger 42 from the selected temperature effect setting of the condition responsive means 46.

Figure 5:
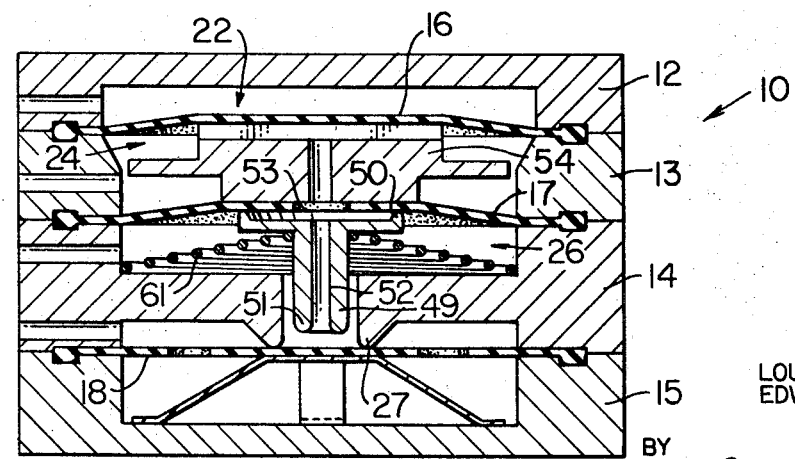
FIG. 5 is a view similar to FIG. 2 and illustrates the pneumatic relay construction in still another operating position thereof.

Conversely, should the temperature output effect of the pneumatically operated heat exchanger device 42 increase a certain amount above the selected temperature output effect setting of the condition responsive means 46, the condition responsive means 46 decreases the pneumatic signal being directed to the pilot chamber 22 of the relay so that the subsequent decrease in pressure in the pilot pressure chamber 22 permits the pressure in the branch pressure chamber 26 to move the intermediate diaphragm 17, motion transmitting member 54 and upper outboard diaphragm 16 upwardly in the manner illustrated in FIG. 5 whereby, if the compression spring 61 is not utilized, the intermediate diaphragm 17 opens away from the valve seat 50 of the valve member 49 to interconnect the branch pressure chamber 26 to the exhaust chamber 24 or, as in the illustrated embodiment where the spring 61 causes the valve member 49 to follow the upward movement of the diaphragm 17, the valve seat 51 of the valve member 49 is moved away from the diaphragm 18 that is closing the valve seat 27 so as to fluidly interconnect the branch pressure chamber 26 through the passage means 52 of the valve member 49 and opening means 53 of the diaphragm 17 to the exhaust chamber 24. In this manner, the branch pressure to the pneumatically operated heat exchanger device 42 is proportionately decreased in relation to the decrease in the pressure of the signal being directed to pilot pressure chamber 22 so as to reduce the output temperature effect of the heat exchanger means 42. Thus, the relay 10 assumes the position illustrated in FIG. 5 until the condition responsive means 46 senses the output temperature effect of the device 42 has now decreased to the selected temperature output effect setting of the condition responsive means 46 and causes the diaphragm stack 16, 54 and 49 to return to the position illustrated in FIG. 3 and maintain the same in that condition until there is again a deviation from the selected output temperature effect.

Therefore, it can be seen that the parts of the pneumatic relay 10 of this invention are not secured together in subassembly arrangements and are self-centering during the assembly thereof as the movement of the valve member 49 of the relay 10 is guided by the stationary valve seat 27 of the housing means 11 and the movement of the motion transmitting member 54 is guided by the internal peripheral surface 23 of the housing member 13 whereby the pneumatic relay 10 functions in a manner previously described to provide an accurate control for the system 39 while being relatively inexpensive to manufacture.

Accordingly, this invention not only provides an improved pneumatic control system, but also this invention provides an improved pneumatic relay or the like for such a pneumatic control system or the like.

We claim:

1. A pneumatic control device comprising a housing means carrying two diaphragm means in stacked relation that cooperate therewith to define a first chamber, a second chamber and a third chamber in stacked relation, said housing means having a stationary valve seat for interconnecting said first chamber and said second chamber together, one of said diaphragm means being adapted to open and close said valve seat, the other of said diaphragm means having opening means therethrough for interconnecting said second chamber and said third chamber together, a movable valve member disposed in said second chamber and having opposed ends, said movable valve member being separate from said two diaphragm means while having said opposed ends respectively disposed inboard of said two diaphragm means, said movable valve member having one of said ends projecting into said valve seat for controlling said opening means by preventing fluid communication between said second chamber and said third chamber when said valve member is engaged by both of said diaphragm means and by permitting fluid communication between said second chamber and said third chamber when said valve member is not engaged by one of said diaphragm means.

2. A pneumatic control device as set forth in claim 1 wherein said valve member has a pair of valve seat means respectively at said opposed ends thereof for respectively seating against said diaphragm means when engaged thereby.

3. A pneumatic control device as set forth in claim 2 wherein said valve seat means of said valve member are fluidly interconnected together by a passage means in said valve member, one of said valve seat means when seating against said other diaphragm means fluidly interconnects said opening means thereof only to said passage means of said valve member by said one valve seat means.

4. A pneumatic control device as set forth in claim 1 wherein said stationary valve seat is disposed between said diaphragm means, said one diaphragm means dividing said first chamber into two sections and having aperture means passing therethrough to fluidly interconnect said two sections together, said one diaphragm means having a larger effective area on the side thereof opposite to said valve seat then the effective area on the side thereof facing said valve seat when said one diaphragm means is closing said valve seat whereby any fluid pressure in said one chamber will tend to maintain said one diaphragm means in its closed position against said valve seat.

5. A pneumatic control device as set forth in claim 4 wherein a spring means is disposed in one of said sections of said first chamber to tend to maintain said one diaphragm means closed against said valve seat.

6. In a pneumatic control system having a pneumatic source and a pneumatically operated device to be controlled, the improvement comprising a pneumatic control device having a housing means carrying two diaphragm means in stacked relation that cooperate therewith to define a first chamber, a second chamber and a third chamber in stacked relation, said housing means having a stationary valve seat for interconnecting said first chamber and said second chamber together, means fluidly interconnecting said first chamber to said pneumatic source and said second chamber to said pneumatically operated device while interconnecting said third chamber to the atmosphere, one of said diaphragm means being adapted to open and close said valve seat, the other of said diaphragm means having opening means therethrough for interconnecting said second chamber and said third chamber together, a movable valve member disposed in said second chamber and having opposed ends, said movable valve member being separate from said two diaphragm means while having said opposed ends respectively disposed inboard of said two diaphragm means, said movable valve member having one of said ends projecting into said valve seat for controlling said opening means by preventing fluid communication between said second chamber and said third chamber when said member is engaged by both of said diaphragm means and by permitting fluid communication between said second chamber and said third chamber when said valve member is not engaged by one of said diaphragm means.

7. In a pneumatic control system as set forth in claim 6, the further improvement wherein said valve member has a pair of valve seat means respectively at said opposed ends thereof for respectively seating against said diaphragm means when engaged thereby.

8. In a pneumatic control system as set forth in claim 7, the further improvement wherein said valve seat means of said valve member are fluidly interconnected together by a passage means in said valve member, one of said valve seat means when seating against said other diaphragm means fluidly interconnects said opening means thereof only to said passage means of said valve member by said one valve seat means.

9. In a pneumatic control system as set forth in claim 6, the further improvement wherein said stationary valve seat is disposed between said diaphragm means, said one diaphragm means, said one diaphragm means dividing said first chamber into two sections and having aperture means passing therethrough to fluidly interconnect said two sections together, said one diaphragm means having a larger effective area on the side thereof opposite to said valve seat than the effective area on the side thereof facing said valve seat when said one diaphragm means is closing said valve seat whereby any fluid pressure in said one chamber will tend to maintain said one diaphragm means in its closed position against said valve seat.

10. In a pneumatic control system as set forth in claim 9, the further improvement wherein a spring means is disposed in one of said sections of said first chamber to tend to maintain said one diaphragm means closed against said valve seat.

11. A pneumatic relay comprising a housing means carrying three diaphragm means in stacked relation that cooperate therewith to define a main pressure chamber, a branch pressure chamber, an exhaust chamber and a pilot pressure chamber in stacked relation, said housing means having a stationary valve seat for interconnecting said main chamber and said branch chamber together, one of the outboard diaphragm means being adapted to open and close said valve seat, the intermediate diaphragm means having opening means therethrough for interconnecting said branch chamber and said exhaust chamber together, a movable valve member disposed in said branch chamber and having opposed ends, said movable member being separate from said intermediate diaphragm means and said one outboard diaphragm means while having said opposed ends respectively disposed inboard of said intermediate diaphragm means and said one outboard diaphragm means, said movable valve member having one of said ends projecting into said valve seat for controlling said opening means by preventing fluid communication between said branch chamber and said exhaust chamber when said valve member is engaged by both said intermediate diaphragm means and said one outboard diaphragm means and by permitting fluid communication between said branch chamber and said exhaust chamber when said valve member is not engaged by one of said one outboard diaphragm means and said intermediate diaphragm means, and motion transmitting means disposed in said exhaust chamber to translate motion of one of the other outboard diaphragm means and said intermediate diaphragm means to the other thereof.

12. A pneumatic relay as set forth in claim 11 wherein said motion transmitting means comprises a single member having passage means passing therethrough and being aligned with said opening means in said intermediate diaphragm means so as to fluidly interconnect said opening means with said exhaust chamber.

13. A pneumatic relay as set forth in claim 12 wherein said motion transmitting member has guide means disposed closely adjacent said housing means to guide movement of said motion transmitting member relative to said housing means while maintaining alignment of said passage means thereof with said opening means of said intermediate diaphragm means.

14. A pneumatic relay as set forth in claim 11 wherein said valve member has a pair of valve seat means respectively at said opposed ends thereof for respectively seating against said intermediate diaphragm means and said one outboard diaphragm means when engaged thereby.

15. A pneumatic relay as set forth in claim 14 wherein said valve seat means of said valve member are fluidly interconnected together by a passage means in said valve member, one of said valve seat means when seating against said intermediate diaphragm means fluidly interconnects said opening means thereof only to said passage means of said valve member by said one valve seat means.

16. In a pneumatic control system having a pneumatic source, a pneumatically operated device to be controlled, and signal means for directing a pilot pneumatic signal in relation to a desired output of said device, the improvement comprising a pneumatic relay having a housing means carrying three diaphragm means in stacked relation that cooperate therewith to define a main pressure chamber, a branch pressure chamber, an exhaust chamber and a pilot pressure chamber in stacked relation, means fluidly interconnecting said main pressure chamber to said pneumatic source, means fluidly interconnecting said branch pressure chamber to said device, means fluidly interconnecting said signal means to said pilot pressure chamber, means fluidly interconnecting said exhaust chamber to the atmosphere, said housing means having a stationary valve seat for interconnecting said main chamber and said branch chamber together, one of the outboard diaphragm means being adapted to open and close said valve seat, said intermediate diaphragm means having opening means therethrough for interconnecting said branch chamber and said exhaust chamber together, a movable valve member disposed in said branch chamber and having opposed ends, said movable valve member being separate from said intermediate diaphragm means and said one outboard diaphragm means while having said opposed ends respectively disposed inboard of said intermediate diaphragm means and said one outboard diaphragm means, said movable valve member having one of said ends projecting into said valve seat for controlling said opening means by preventing fluid communication between said branch chamber and said exhaust chamber when said valve member is engaged by both said intermediate diaphragm means and said one outboard diaphragm means and by permitting fluid communication between said branch chamber and said exhaust chamber when said valve member is not engaged by one of said one outboard diaphragm means and said intermediate diaphragm means and motion transmitting means disposed in said exhaust chamber to translate motion of one of the other outboard diaphragm means and said intermediate diaphragm means to the other thereof.

17. In a pneumatic control system as set forth in claim 16, the further improvement wherein said motion transmitting means comprises a single member having passage means passing therethrough and being aligned with said opening means in said intermediate diaphragm means so as to fluidly interconnect said opening means with said exhaust chamber.

18. In a pneumatic control system as set forth in claim 17, the further improvement wherein said motion transmitting member has guide means disposed closely adjacent said housing means to guide movement of said motion transmitting member relative to said housing means while maintaining alignment of said passage means thereof with said opening means of said intermediate diaphragm means.

19. In a pneumatic control system as set forth in claim 16, the further improvement wherein said valve member has a pair of valve seat means respectively at said opposed ends thereof for respectively seating against said intermediate diaphragm means and said one outboard diaphragm means when engaged thereby.

20. In a pneumatic control system as set forth in claim 19, the further improvement wherein said valve seat means of said valve member are fluidly interconnected together by a passage means in said valve member, one of said valve seat means when seating against said intermediate diaphragm means fluidly interconnects said opening means thereof only to said passage means of said valve member by said one valve seat means.